(12) United States Patent
Yang

(10) Patent No.: US 10,937,423 B2
(45) Date of Patent: Mar. 2, 2021

(54) SMART DEVICE FUNCTION GUIDING METHOD AND SYSTEM

(71) Applicant: BAIDU ONLINE NETWORK TECHNOLOGY (BEIJING) CO., LTD., Beijing (CN)

(72) Inventor: Peng Yang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 184 days.

(21) Appl. No.: 16/192,513

(22) Filed: Nov. 15, 2018

(65) Prior Publication Data

US 2019/0237072 A1 Aug. 1, 2019

(30) Foreign Application Priority Data

Feb. 1, 2018 (CN) .......................... 201810102549.X

(51) Int. Cl.
*G10L 15/22* (2006.01)
*G10L 15/18* (2013.01)

(52) U.S. Cl.
CPC .......... *G10L 15/22* (2013.01); *G10L 15/1815* (2013.01); *G10L 15/1822* (2013.01); *G10L 2015/223* (2013.01); *G10L 2015/228* (2013.01)

(58) Field of Classification Search
CPC ............................... G10L 15/22; G10L 15/26
See application file for complete search history.

(56) References Cited

U.S. PATENT DOCUMENTS

| 6,964,023 B2 * | 11/2005 | Maes | G06K 9/00248 |
| | | | 715/811 |
| 7,137,126 B1 * | 11/2006 | Coffman | G06F 3/167 |
| | | | 719/328 |

(Continued)

FOREIGN PATENT DOCUMENTS

| CN | 202453859 U | 9/2012 |
| CN | 103902629 A | 7/2014 |

(Continued)

OTHER PUBLICATIONS

First Office Action and search report from CN app. No. 201810102549.X, dated Mar. 13, 2019, with English translation provided by Global Dossier.

(Continued)

*Primary Examiner* — Michael N Opsasnick
(74) *Attorney, Agent, or Firm* — Ladas & Parry, LLP

(57) ABSTRACT

The present disclosure provides a smart device function guiding method and system, wherein the method comprises: obtaining a user's speech data and obtaining an operation instruction corresponding to the speech data; judging whether the operation instruction complies with a preset guidance condition, and sending a guidance speech to the smart device if the operation instruction complies with the preset guidance condition. The solution of the present disclosure can be employed to improve the efficiency of performing function guidance through speech interaction as compared with the manner of performing the function guidance through the APP or providing simple speech function guidance in the prior art.

14 Claims, 2 Drawing Sheets

Obtain a user's speech data and obtain an operation instruction corresponding to the speech data — S11

Judge whether the operation instruction complies with a preset guidance condition, and send a guidance speech to the smart device if the operation instruction complies with the preset guidance condition — S12

(56) References Cited

U.S. PATENT DOCUMENTS

| | | | | |
|---|---|---|---|---|
| 2002/0135618 | A1* | 9/2002 | Maes | G10L 15/24 |
| | | | | 715/767 |
| 2007/0043574 | A1* | 2/2007 | Coffman | G06F 3/167 |
| | | | | 704/275 |
| 2009/0276419 | A1* | 11/2009 | Jones | G06F 16/3322 |
| 2009/0313026 | A1* | 12/2009 | Coffman | H04M 3/4938 |
| | | | | 704/275 |
| 2014/0201202 | A1* | 7/2014 | Jones | G06F 16/24578 |
| | | | | 707/723 |

FOREIGN PATENT DOCUMENTS

| CN | 105895093 | A | 8/2016 |
|---|---|---|---|
| CN | 105975511 | A | 9/2016 |
| CN | 106205615 | A | 12/2016 |
| CN | 106233246 | A | 12/2016 |
| CN | 106302972 | A | 1/2017 |
| CN | 205881452 | U | 1/2017 |
| CN | 107146612 | A | 9/2017 |
| JP | 2004258233 | A | 9/2004 |
| JP | 2008268517 | A | 11/2008 |
| JP | 2017090613 | A | 5/2017 |

OTHER PUBLICATIONS

Second Office Action from CN app. No. 201810102549.X, dated Jul. 5, 2019, with English translation provided by Global Dossier.
Third Office Action from CN app. No. 201810102549.X, dated Sep. 18, 2019, with English translation provided by Global Dossier.
Notification to Grant Patent Right for Invention and supplementary search from CN app. No. 201810102549.X, dated Dec. 3, 2019, with English translation from Global Dossier.
Notice of Reasons for Refusal from JP app. No. 2018-212637, dated Dec. 3, 2019, with English translation from Global Dossier.

* cited by examiner

SMART DEVICE FUNCTION GUIDING METHOD AND SYSTEM

The present application claims the priority to Chinese Patent Application No. 201810102549.X, filed on Feb. 1, 2018, with the title of "Smart device function guiding method and system". The disclosure of the above applications is incorporated herein by reference in its entirety.

FIELD OF THE DISCLOSURE

The present disclosure relates to computer application technologies, and particularly to a smart device function guiding method and system.

BACKGROUND OF THE DISCLOSURE

As speech recognition technology gets mature increasingly, more and more smart devices are arising in the market, for example a smart loudspeaker box. These smart devices provide a more convenient interaction manner for the consumer based on the speech recognition technology.

In mobile internet, APP guiding functions are made very thorough. When the user uses for the first time, there will be a guidance page of a key function, even a gesture operation click guidance, and there will further be a basic use task course, a complete helping page and a page for contacting a client service center.

The current smart device such as smart loudspeaker boxes still conform to this guidance manner to primarily provide guidance of use on mateApp (an APP for distributing a network for a smart loudspeaker box and device management), and secondarily provide certain speech guidance on the smart loudspeaker box, and furthermore, the guidance is mainly key operations and state prompts. The guidance about use of functions is very weak.

When the user uses the smart loudspeaker box for the first time, it is necessary to perform operations such as downloading mateApp for network distribution and pairing. After a network is distributed for the mateApp, the App enters a guidance interface which is used for the first time, including examples of queries such as how to converse and interact with the loudspeaker box, personal likes of music and crosstalk, and key functions. Then, the user preliminarily learns about the loudspeaker box by reading these guidance. In addition, the App has a function helper page in which there are examples of queries for corresponding functions, and the user may review for illustration. The App further has a question helper page, and the user may learn about use of functions by performing question-and-answer with a robot or by asking for help from the client service. Furthermore, a message interface of the App has new function recommendations or function recommendations which are never used by the user. Simply speaking, the guidance function keeps consistent with the guidance manner of a conventional mobile internet APP, and the user needs to look up in the App for help to solve problems.

However, the frequency of the user using the network distribution mateApp is very low. After the network is distributed successfully for the first time, the smart loudspeaker box may be used individually, and too many interactions with the mateApp are unnecessary. As a result, when the user uses the smart loudspeaker box, he might not learn about many functions, nor does he know how to operate. Furthermore, the user might not readily seek for help of use in the mateApp because this is too troublesome and the use costs are high.

Furthermore, a screen-less smart loudspeaker box interacts with the user totally by speech interaction due to absence of the screen. The speech guidance of the smart loudspeaker box mainly includes state prompt (e.g., "connection to the network fails, please check the network"), operation prompt ("long press a button in the middle of the top of the loudspeaker box 6 seconds, and enter a network distribution mode to distribute a network for the loudspeaker box"), guidance self-introduction upon use for the first time and so on. However, these do not involve detailed function guidance and help of functions of the loudspeaker box. For example, the user knows tuning up the volume by initiating the query "louder", but he does not know that the volume ranges from 1 to 100, and the volume may be tuned up by initiating the query "tune to 50". In this case, the user might have to speak "louder" many times to tune the volume to 50. Apparently, this is an inefficient and impatient operation. If the user wants to know this function, he must open the App to look up for the help in using the system, which is apparently an unsmart and inconvenient manner.

SUMMARY OF THE DISCLOSURE

A plurality of aspects of the present disclosure provide a smart device function guiding method and system, a device and a storage medium, which can improve the efficiency of performing function guidance through speech interaction.

According to an aspect of the present disclosures there is provided a smart device function guiding method, comprising:

so obtaining a user's speech data and obtaining an operation instruction corresponding to the speech data;

judging whether the operation instruction complies with a preset guidance condition, and sending a guidance speech to the smart device if the operation instruction complies with the preset guidance condition.

The abovementioned aspect and any possible implementation mode further provide an implementation mode: the obtaining a user's speech data and obtaining an operation instruction corresponding to the speech data comprises:

receiving the user's speech data obtained by monitoring of the smart device;

performing speech recognition for the speech data to obtain a recognized text corresponding to the speech data;

performing semantic analysis for the recognized text to obtain the operation instruction corresponding to the recognized text.

The abovementioned aspect and any possible implementation mode further provide an implementation mode: the sending a guidance speech to the smart device if the operation instruction complies with the preset guidance condition comprises:

if the operation instruction is of an active question-asking type, looking up the preset guidance speech corresponding to the operation instruction in a function guidance library, sending the preset guidance speech to the smart device, and performing passive function guidance to the user.

The abovementioned aspect and any possible implementation mode further provide an implementation mode:

performing a single round of passive function guidance or multiple rounds of passive function guidance to the user according to a function complexity degree corresponding to the operation instruction.

The abovementioned aspect and any possible implementation mode further provide an implementation mode: the sending a guidance speech to the smart device if the operation instruction complies with the preset guidance condition comprises:

if the operation instruction is of a function operating type and reaches the preset trigger condition of the function operating type instruction, looking up the preset guidance speech corresponding to the operation instruction in a function guidance library, sending the preset guidance speech to the smart device, and performing active function guidance to the user.

The abovementioned aspect and any possible implementation mode further provide an implementation mode: the preset trigger condition comprises at least one of the following:

the user sends the operation instruction with respect to a certain function for the first time;

the operation instruction is a less-efficient operation instruction, and times of sending by the user within a preset time period reach a preset times threshold;

the user sends the operation instruction frequently and there exist other operation instructions for implementing the same function:

the operation instruction has similar operation instructions or functions which newly get online.

The abovementioned aspect and any possible implementation mode further provide an implementation mode: when the preset trigger condition is that the user sends the operation instruction with respect to a certain function for the first time, the corresponding preset guidance speech is an important instruction of the function;

when the preset trigger condition is that the operation instruction is a less-efficient operation instruction, and times of sending by the user within a preset time period reach a preset times threshold, the corresponding preset guidance speech is a high-efficient operation instruction corresponding to the operation instruction;

when the preset trigger condition is that the user sends the operation instruction frequently and there exist other operation instructions for implementing the same function, the corresponding preset guidance speech is other operation instructions of the function;

when the preset trigger condition is that the operation instruction has similar operation instructions or functions which newly get online, the corresponding preset guidance speech is similar operation instructions or functions which newly get online.

The abovementioned aspect and any possible implementation mode further provide an implementation mode: the method further comprises:

executing the operation instruction.

According to another aspect of the present disclosure, there is provided a smart device function guiding system, comprising:

a parsing module configured to obtain a user's speech data and obtain an operation instruction corresponding to the speech data;

a guiding module configured to judge whether the operation instruction complies with a preset guidance condition, and send a guidance speech to the smart device if the operation instruction complies with the preset guidance condition.

The abovementioned aspect and any possible implementation mode further provide an implementation mode: the parsing module comprises:

a receiving submodule configured to receive the user's speech data obtained by monitoring of the smart device;

a speech recognizing submodule configured to perform speech recognition for the speech data to obtain a recognized text corresponding to the speech data;

a semantic analysis submodule configured to perform semantic analysis for the recognized text to obtain the operation instruction corresponding to the recognized text.

The abovementioned aspect and any possible implementation mode further provide an implementation mode: the guiding module is specifically configured to:

if the operation instruction is of an active question-asking type, look up the preset guidance speech corresponding to the operation instruction in a function guidance library, send the preset guidance speech to the smart device, and perform passive function guidance to the user.

The abovementioned aspect and any possible implementation mode further provide an implementation mode: the guiding module is specifically configured to:

perform a single round of passive function guidance or multiple rounds of passive function guidance to the user according to a function complexity degree corresponding to the operation instruction.

The abovementioned aspect and any possible implementation mode further provide an implementation mode: the guiding module is specifically configured to:

if the operation instruction is of a function operating type and reaches the preset trigger condition of the function operating type instruction, look up the preset guidance speech corresponding to the operation instruction in a function guidance library, send the preset guidance speech to the smart device, and perform active function guidance to the user.

The abovementioned aspect and any possible implementation mode further provide an implementation mode: the preset trigger condition comprises at least one of the following:

the user sends the operation instruction with respect to a certain function for the first time;

the operation instruction is a less-efficient operation instruction, and times of sending by the user within a preset time period reach a preset times threshold;

the user sends the operation instruction frequently and there exist other operation instructions for implementing the same function;

the operation instruction has similar operation instructions or functions which newly get online.

The abovementioned aspect and any possible implementation mode further provide an implementation mode: when the preset trigger condition is that the user sends the operation instruction with respect to a certain function for the first time, the corresponding preset guidance speech is an important instruction of the function;

when the preset trigger condition is that the operation instruction is a less-efficient operation instruction, and times of sending by the user within a preset time period reach a preset times threshold, the corresponding preset guidance speech is a high-efficient operation instruction corresponding to the operation instruction;

when the preset trigger condition is that the user sends the operation instruction frequently and there exist other operation instructions for implementing the same function, the corresponding preset guidance speech is other operation instructions of the function;

when the preset trigger condition is that the operation instruction has similar operation instructions or functions which newly get online, the corresponding preset guidance speech is similar operation instructions or functions which newly get online.

The abovementioned aspect and any possible implementation mode further provide an implementation mode: the guiding module is further configured to:

execute the operation instruction.

A further aspect of the present disclosure provides a computer device, comprising a memory, a processor and a computer program which is stored on the memory and runnable on the processor, wherein the processor, upon executing the program, implements the above-mentioned method.

A further aspect of the present disclosure provides a computer-readable storage medium on which a computer program is stored, wherein the program, when executed by a processor, implements the aforesaid method.

As known from the above introduction, the solution of the present disclosure can improve the efficiency of performing function guidance through speech interaction as compared with the manner of performing the function guidance through the APP or providing simple speech function guidance in the prior art.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

Figure 1:
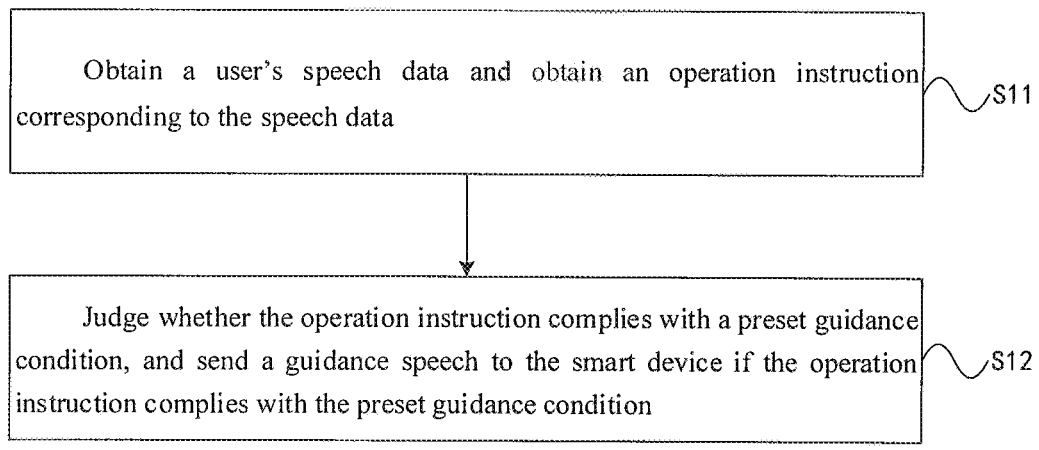
FIG. 1 is a flow chart of a smart device function guiding method according to the present disclosure.

FIG. 1 is a flow chart of a smart device function guiding method according to the present disclosure. As shown in FIG. 1, the method comprises the following steps:

Step S11: obtaining the user's speech data and obtaining an operation instruction corresponding to the speech data;

Step S12: judging whether the operation instruction complies with a preset guidance condition, and sending a guidance speech to the smart device if the operation instruction complies with the preset guidance condition.

The method according to the present embodiment may be executed by a cloud server or executed by other servers.

In a preferred implementation mode of step S11,

Preferably, obtaining the user's speech data and obtaining an operation instruction corresponding to the speech data comprises the following sub-steps:

Stab-step S111: the cloud server receives the user's speech data obtained by monitoring of the smart device;

The user may interact with the smart device via the speech, and the smart device may monitor to obtain speech information sent by the user.

Preferably, a MIC array of the smart device, for example a smart loudspeaker box, monitors to obtain the speech information sent by the user. The smart device sends the monitored user's speech data to the cloud server.

Sub-step S112: the cloud server performs speech recognition for the speech data to obtain a recognized text corresponding to the speech data;

Preferably, the cloud server invokes automatic speech recognition (ASR) service to parse the user's speech data to obtain a speech recognition result corresponding to the speech. The speech recognition result is a recognized text corresponding to the speech.

The speech recognition process may employ some current speech recognition technologies, mainly including: performing feature extraction for the speech data, using the extracted feature data and pre-trained acoustic model and language model to decode, determining a grammar unit corresponding to the speech data upon decoding, the grammar unit being for example a phoneme or syllable, and obtaining a recognized text corresponding to the current speech according to a decoding result.

Sub-step S113: the cloud server performs semantic analysis for the recognized text to obtain the operation instruction corresponding to the recognized text.

The cloud server performs precise matching for the recognized text in the preset operation instructions to look for a corresponding operation instruction; if an operation instruction precisely matched with the recognized text is not found, performs word segmentation processing for the recognized text to generate a keyword; according to the keyword, looks in the preset operation instructions for an operation instruction matched with the keyword.

Preferably, it is possible to, based on a semantic recognition technology, match the recognized text with the preset operation instructions. For example, it is possible to process the recognized text and the preset operation instructions based on the semantic recognition technology, calculate a similarity between the two, and determine that the matching, is successful if the similarity between the two is larger than a similarity threshold; otherwise, determine that the matching is unsuccessful. The similarity threshold is not specifically limited in the present embodiment, for example, the similarity threshold may be 0.8.

In a preferred implementation mode of step S12,

Judging whether the operation instruction complies with the preset guidance condition, and sending a preset guidance speech to the smart device according to the preset guidance condition corresponding thereto.

The preset guidance condition may be classified into the following cases:

the operation instruction is of an active question-asking type;

the operation instruction is of a function operating type.

Regarding the case in which the operation instruction is of an active question-asking type, the user actively asks a question to the smart loudspeaker box about how a certain function is operated or how to use the function, for example, the user speaks out the query "how to conveniently tune the volume?", "is there any new function?", "what function have I not used?", "can I ask to play music according to a singer's name?", and so on. The cloud server looks up the preset guidance speech corresponding to the operation instruction in a function guidance library, sends the preset guidance speech to the smart device, and performs passive function guidance to the user.

Preferably, it is possible to set a single round of guidance and multiple rounds of guidance according to a function complexity degree corresponding, to the operation instruction in the function guidance library.

The single round of guidance is adapted for a function with less content, and multiple rounds of guidance are adapted for a function with more content, wherein, An example of the single round of passive function guidance is as follows, the cloud server looks up in the function guidance library to obtain the preset guidance speech corresponding to the operation instruction, and sends the preset guidance speech to the smart device. For example, if the user speaks out the query "how to conveniently tune the volume?", the cloud server looks up in the function guidance library to obtain the preset guidance speech corresponding to the operation instruction, for example, "you may directly say 'xiaodu, xiaodu, a lower volume'", or directly say a volume value between 0 and 100, e.g., 'Xiaodu Xiaodu, tune the volume to 50'", and sends the preset guidance speech to the smart device.

An example of multiple rounds of passive function guidance is as follows: since the multiple rounds of passive function guidance has complicated content, a high-frequency query instruction is preferably recommended; if the user is willing to learn more, he may enter multiple rounds.

Preferably, the preset guidance speech corresponding to the operation instruction includes a plurality of pieces which are ranked according to their use frequencies. First, it is possible to push one piece or more pieces of high-frequency preset guidance speech to the user, and continue to push other preset guidance speech according to the user's selection.

For example, if the user asks "how to play a song?", the loudspeaker box answers "you may directly ask for a singer, for example, 'Xiaodu, Xiaodu, I want to listen to Jay Chou's songs'. You may ask for play a song according to the singer's name+song name, for example, 'Xiaodu, Xiaodu, Jay Chou's Qinghuaci', You may directly say a song's classification, e.g., 'Xiaodu, Xiaodu, play rock and roll music'"; then the loudspeaker box continues multiple rounds "do you want to know more on-demand playing manners?"; if the user selects yes, continue to answer the function guidance content; if the user selects no, exit from the function guidance.

Through the above implementation manner, the user may describe his own question and puzzles in using functions in a human language, the cloud server precisely parses and matches a corresponding function guidance speech so that the user can quickly obtain the answer without need to open the mobile phone App to find the function guidance page step by step to look for the answer.

Regarding the case that the operation instruction is of a function operating type, i.e., the user and the smart loudspeaker box perform speech interaction operations, and the user instructs the smart loudspeaker box to perform a preset function.

Preferably, when a preset trigger condition of the operation instruction is reached, the cloud server looks up in the function guidance library to obtain the preset guidance speech corresponding to the operation instruction, and sends the preset guidance speech to the smart loudspeaker box.

The preset trigger condition comprises;

the user sends the operation instruction with respect to a certain function for the first time;

the operation instruction is a less-efficient operation instruction, and times of sending by the user within a preset time period reach a preset times threshold;

the user sends the operation instruction frequently and there exist other operation instructions for implementing the same function;

the operation instruction has similar operation instructions or functions which newly get online.

Preferably, regarding the preset trigger condition that the user sends the operation instruction with respect to a certain function for the first time, the cloud server queries in the user's historical operation records, judges that the operation instruction is sent by the user for the first time, namely, the user uses the function corresponding to the operation instruction for the first time, and triggers the active function guidance. The cloud server queries in the function guidance library to obtain the preset guidance speech corresponding to the operation instruction under the trigger condition, and while executing the user's operation instruction, sends the preset guidance speech to the smart loudspeaker box, wherein the preset guidance speech is an important instruction of the function.

For example, the user uses a certain function for the first time, and the smart loudspeaker box's play is attached with speech guidance of some important instructions. If the user plays music for the first time, the loudspeaker box, in addition to broadcasting TTS of the singer and song name, says "if you meet a favorite song, you may directly say 'Xiaodu, Xiaodu, store this song in favorites' to me". Such guidance teaches the user an important instruction when the user uses a certain function for the first time, and enables the user to use more efficiently, instead of superimposing guidance of all functions together for function guidance because speech interaction is not adapted for too much content and it is difficult for the user to accept so much content in a short period of time. This is distinct from a conventional interface interaction design.

Preferably, regarding the trigger condition that the operation instruction is a less-efficient operation instruction, and times of sending by the user within a preset time period reach a preset times threshold, the cloud server queries in the user's historical operation records, judges that the operation instruction is continuously sent by the user, and sending times reach a threshold, for example three times, i.e., the operation instruction sent by the user is a less-efficient operation instruction; triggers the active function guidance. The cloud server queries in the function guidance library to obtain the preset guidance speech corresponding to the operation instruction under the trigger condition, and sends the preset guidance speech to the smart loudspeaker box, wherein the preset guidance speech is a highly-efficient operation instruction corresponding to the operation instruction.

For example, when the user uses the low-efficient query three times consecutively, the active function guidance is triggered. Since the user does not learn about some function adaptations, he might use some complicated less-efficient instructions for speech dialogue, which will substantially reduce the user's experience. If the user feels the volume low upon using the loudspeaker box, he may speak "Xiaodu, Xiaodu, a louder volume", but he still feels the volume low, he continues to speak "Xiaodu, Xiaodu, a louder volume", the so doing is done three times consecutively, whereupon the active function guidance of the loudspeaker box is triggered, and the cloud server sends the smart loudspeaker box "you may directly speak a volume value between 0 and 100, for example, you may speak 'Xiaodu, Xiaodu, tune the volume to 50'" to me to remind the user. In this manner, only when the user feels puzzled and performs complicated operations does the loudspeaker box remind actively, and teach the user the high-efficient operation instruction, and give the user a sense of humanistic care.

Preferably, regarding the trigger condition that the user sends the operation instruction frequently and there exist other operation instructions for implementing the same function, the cloud server queries in the user's historical operation records, judges that the operation instruction is sent by the user frequently, and the user seldom sends or never sends other similar instructions implementing the same function; triggers the active function guidance. The cloud server queries in the function guidance library to obtain the preset guidance speech corresponding to the operation instruction under the trigger condition, and sends the preset guidance speech to the smart loudspeaker box, wherein the preset guidance speech is other operation instructions of the function.

For example, the user often uses a single query, i.e., the user uses the same query of a certain function for many times, and the loudspeaker box actively reminds the user to try speaking other operation instructions of the function. For example, the user always speaks "play music" and never says other playing manners of the music function. The cloud server, in addition to executing the user's operation instruction, and broadcasting the TTS of the singer and song names, further speaks "you may directly speak out the singer's name, or song name or song list to play music." Such active recommendation mainly aims to enrich the user's operation query and use product functions in more dimensions.

Preferably, the operation instruction has similar operation instructions or functions which newly get online. The cloud server checks whether new instructions or new functions related to the operation instruction get online in the loudspeaker box, and while executing the user's operation instruction, sends the smart loudspeaker box the preset guidance speech of the new instructions or new functions.

Preferably, the cloud server may, in real time or regularly, check whether new instructions or new functions related to the operation instruction get online in the loudspeaker box.

For example, the user asks to play music, the cloud server checks and finds that a scenario song play-on-demand function newly gets online, and replies "ok, play Jay Chou's Qinghuaci for you soon, you may ask for playing a song according to a scenario, for example, say 'a song for listening in subway'", to recommend the scenario song play-on-demand function that newly gets online to the user. Such scenario can offer function guidance to the user very lightly, but the function may be recommended at a time interval, and the frequency is controlled to avoid disturbing the user.

In a preferred implementation mode of the present embodiment, preferably, the preset guidance condition further comprises: the speech data corresponding to invalid instruction. If the speech data corresponds to invalid instruction, i.e., the corresponding operating instruction is not recognized, the cloud server sends the smart device a preset guidance speech with the highest use frequency, for example, "if you'd like to listen to music, you may speak 'I'd like to listen to music' to me". The guidance speech here is used to guide the user to send a valid instruction. A specific guidance speech is not limited.

Preferably, the preset guidance speech may be a recorded audio, or a speech signal obtained by converting text data into speech by using a Text to Speech speech synthesis software TTS (Text to Speech).

According to the method of the present disclosure, it is possible to, through the passive function guidance, satisfy the user's active question-asking, and answer right after the question is asked, without causing information complexity and confusion to the user; it is possible to, through the active function guidance, trigger according to the user's operation, and offer a reminder when the user feels puzzled and needs reminding. It is possible to enable the user to perform function guidance efficiently and concisely through speech interaction.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

The above is introduction of the method embodiment. The solution of the present disclosure will be further described through a system embodiment.

Figure 2:
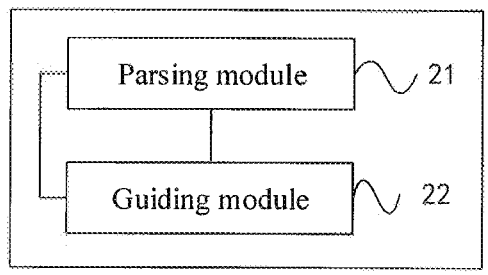
FIG. 2 is a structural schematic diagram of a smart device function guiding system according to the present disclosure.

FIG. 2 is a structural schematic diagram of a smart device function guiding system according to the present disclosure. As shown in FIG. 2, the system comprises:

a parsing module 21 configured to obtain the user's speech data and obtain an operation instruction corresponding to the speech data;

a guiding module 22 configured to judge whether the operation instruction complies with a preset guidance condition, and send a guidance speech to the smart device if the operation instruction complies with the preset guidance condition.

The method according to the present embodiment may be executed by a cloud server or executed by other servers.

In a preferred implementation mode of the parsing module 21, the parsing module 21 comprises;

a receiving submodule 211 configured to receive the user's speech data obtained by monitoring of the smart device:

The user may interact with the smart device via the speech, and the smart device may monitor to obtain speech information sent by the user.

Preferably, a MIC array of the smart device, for example a smart loudspeaker box, monitors to obtain the speech information sent by the user. The receiving submodule 211 sends the monitored user's speech data to the cloud server.

a speech recognizing submodule 212 configured to perform speech recognition for the speech data to obtain a recognized text corresponding to the speech data;

Preferably, the cloud server invokes automatic speech recognition (ASR) service to parse the user's speech data to obtain a speech recognition result corresponding to the speech. The speech recognition result is a recognized text corresponding to the speech.

The speech recognition process may employ some current speech recognition technologies, mainly including: performing feature extraction for the speech data, using the extracted feature data and pre-trained acoustic model and language model to decode, determining a grammar unit corresponding to the speech data upon decoding, the grammar unit being for example a phoneme or syllable, and obtaining a recognized text corresponding to the current speech according to a decoding result.

a semantic analysis submodule 213 configured to perform semantic analysis for the recognized text to obtain the operation instruction corresponding to the recognized text.

The cloud server performs precise matching for the recognized text in the preset operation instructions to look for a corresponding operation instruction; if an operation instruction precisely matched with the recognized text is not found, performs word segmentation processing for the recognized text to generate a keyword; according to the keyword, looks in the preset operation instructions for an operation instruction matched with the keyword.

Preferably, it is possible to, based on a semantic recognition technology, match the recognized text with the preset operation instructions. For example, it is possible to process the recognized text and the preset operation instructions based on the semantic recognition technology, calculate a similarity between the two, and determine that the matching is successful if the similarity between the two is larger than a similarity threshold; otherwise, determine that the matching is unsuccessful. The similarity threshold is not specifically limited in the present embodiment, for example, the similarity threshold may be 0.8.

In a preferred implementation mode of the guiding module 22,

Judging whether the operation instruction complies with the preset guidance condition, and sending a preset guidance speech to the smart device according to the preset guidance condition corresponding thereto.

The preset guidance condition may be classified into the following cases:

the operation instruction is of an active question-asking type;

the operation instruction is of a function operating type.

Regarding the case in which the operation instruction is of an active question-asking type, the user actively asks a question to the smart loudspeaker box about how a certain function is operated or how to use the function, for example, the user speaks out the query "how to conveniently tune the volume?", "is there any new function?", "what function have I not used?", "can I ask to play music according to a singer's name?", and so on. The cloud server looks up the preset guidance speech corresponding to the operation instruction in a function guidance library, sends the preset guidance speech to the smart device, and performs passive function guidance to the user.

Preferably, it is possible to set a single round of guidance and multiple rounds of guidance according to a function complexity degree corresponding to the operation instruction in the function guidance library.

The single round of guidance is adapted for a function with less content, and multiple rounds of guidance are adapted for a function with more content, wherein, An example of the single round of passive function guidance is as follows: the cloud server looks up in the function guidance library to obtain the preset guidance speech corresponding to the operation instruction, and sends the preset guidance speech to the smart loudspeaker box. For example, if the user speaks out the query "how to conveniently tune the volume?", the cloud server looks up in the function guidance library to obtain the preset guidance speech corresponding to the operation instruction, for example, "you may directly say 'xiaodu, xiaodu, a lower volume'", or directly say a volume value between 0 and 100, e.g., 'Xiaodu Xiaodu, tune the volume to 50'", and sends the preset guidance speech to the smart loudspeaker box.

An example of multiple rounds of passive function guidance is as follows: since the multiple rounds of passive function guidance has complicated content, a high-frequency query instruction is preferably recommended; if the user is willing to learn more, he may enter multiple rounds.

Preferably, the preset guidance speech corresponding to the operation instruction includes a plurality of pieces which are ranked according to their use frequencies. First, it is possible to push one piece or more pieces of high-frequency preset guidance speech to the user, and then continue to push other preset guidance speech according to the user's selection.

For example, if the user asks "how to play a song?", the loudspeaker box answers "you may directly ask for a singer, for example, 'Xiaodu, Xiaodu, I want to listen to Jay Chou's songs'. You may ask for play a song according to the singer's name+song name, for example, 'Xiaodu, Xiaodu, Jay Chou's Qinghuaci'. You may directly say a song's classification, e.g., 'Xiaodu, Xiaodu, play rock and roll music'"; then the loudspeaker box continues multiple rounds "do you want to know more on-demand playing manners?"; if the user selects yes, continue to answer the function guidance content; if the user selects no, exit from the function guidance.

Through the above implementation manner, the user may describe his own question and puzzles in using functions in a human language, the cloud server precisely parses and matches a corresponding function guidance speech so that the user can quickly obtain the answer without need to open the mobile phone App to find the function guidance page step by step to look for the answer.

Regarding the case that the operation instruction is of a function operating type, i.e., the user and the smart loudspeaker box perform speech interaction operations, and the user instructs the smart loudspeaker box to perform a preset function.

Preferably, when a preset trigger condition of the operation instruction is reached, the cloud server looks up in the function guidance library to obtain the preset guidance speech corresponding to the operation instruction, and sends the preset guidance speech to the smart loudspeaker box.

The preset trigger condition comprises:

the user sends the operation instruction with respect to a certain function for the first time;

the operation instruction is a less-efficient operation instruction, and times of sending by the user within a preset time period reach a preset times threshold;

the user sends the operation instruction frequently and there exist other operation instructions for implementing the same function;

the operation instruction has similar operation instructions or functions which newly get online.

Preferably, regarding the preset trigger condition that the user sends the operation instruction with respect to a certain function for the first time, the cloud server queries in the user's historical operation records, judges that the operation instruction is sent by the user for the first time, namely, the user uses the function corresponding to the operation instruction for the first time, and triggers the active function guidance. The cloud server queries in the function guidance library to obtain the preset guidance speech corresponding to the operation instruction under the trigger condition, and while executing the user's operation instruction, sends the preset guidance speech to the smart loudspeaker box, wherein the preset guidance speech is an important instruction of the function.

For example, the user uses a certain function for the first time, and the smart loudspeaker box's play is attached with speech guidance of some important instructions. If the user plays music for the first time, the loudspeaker box, in addition to broadcasting TTS of the singer and song name, says "if you meet a favorite song, you may directly say 'Xiaodu, Xiaodu, store this song in favorites' to me". Such guidance teaches the user an important instruction when the user uses a certain function for the first time, and enables the user to use more efficiently, instead of superimposing guidance of all functions together for function guidance because speech interaction is not adapted for too much content and it is difficult for the user to accept so much content in a short period of time. This is distinct from a conventional interface interaction design.

Preferably, regarding the trigger condition that the operation instruction is a less-efficient operation instruction, and times of sending by the user within a preset time period reach a preset times threshold, the cloud server queries in the user's historical operation records, judges that the operation instruction is continuously sent by the user, and sending times reach a threshold, for example three times, the operation instruction sent by the user is a less-efficient operation instruction; triggers the active function guidance. The cloud server queries in the function guidance library to obtain the preset guidance speech corresponding to the operation instruction under the trigger condition, and sends the preset guidance speech to the smart loudspeaker box, wherein the preset guidance speech is a highly-efficient operation instruction corresponding to the operation instruction.

For example, when the user uses the low-efficient query three times consecutively, the active function guidance is triggered. Since the user does not learn about some function adaptations, he might use some complicated less-efficient instructions for speech dialogue, which will substantially reduce the user's experience. If the user feels the volume low upon using the loudspeaker box, he may speak "Xiaodu, Xiaodu, a louder volume", but he still feels the volume low, he continues to speak "Xiaodu, Xiaodu, a louder volume", the so doing is done three times consecutively, whereupon the active function guidance of the loudspeaker box is triggered, and the cloud server sends the smart loudspeaker box "you may directly speak a volume value between 0 and 100, for example, you may speak 'Xiaodu, Xiaodu, tune the volume to 50'" to me to remind the user. In this manner, only when the user feels puzzled and performs complicated operations does the loudspeaker box remind actively, and teach the user the high-efficient operation instruction, and give the user a sense of humanistic care.

Preferably, regarding the trigger condition that the user sends the operation instruction frequently and there exist other operation instructions for implementing the same function, the cloud server queries in the user's historical operation records, judges that the operation instruction is sent by the user frequently, and the user seldom sends or never sends other similar instructions implementing the same function; triggers the active function guidance. The cloud server queries in the function guidance library to obtain the preset guidance speech corresponding to the operation instruction under the trigger condition, and sends the preset guidance speech to the smart loudspeaker box, wherein the preset guidance speech is other operation instructions of the function.

For example, the user often uses a single query, i.e., the user uses the same query of a certain function for many times, and the loudspeaker box actively reminds the user to try speaking other operation instructions of the function. For example, the user always speaks "play music" and never says other playing manners of the music function. The cloud server, in addition to executing the user's operation instruction, and broadcasting the TTS of the singer and song names, further speaks "you may directly speak out the singer's name, or song name or song list to play music." Such active recommendation mainly aims to enrich the user's operation query and use product functions in more dimensions.

Preferably, the operation instruction has similar operation instructions or functions which newly get online. The cloud server checks whether new instructions or new functions related to the operation instruction get online in the loudspeaker box, and while executing the user's operation instruction, sends the smart loudspeaker box the preset guidance speech of the new instructions or new functions.

Preferably, the cloud server may, in real time or regularly, check whether new instructions or new functions related to the operation instruction get online in the loudspeaker box.

For example, the user asks to play music, the cloud server checks and finds that a scenario song play-on-demand function newly gets online, and replies "ok, play Jay Chou's Qinghuaci for you soon, you may ask for playing a song according to a scenario, for example, say 'a song for listening in subway'", to recommend the scenario song play-on-demand function that newly gets online to the user. Such scenario can offer function guidance to the user very lightly, but the function may be recommended at a time interval, and the frequency is controlled to avoid disturbing the user.

In a preferred implementation mode of the present embodiment, preferably, the preset guidance condition further comprises: the speech data corresponding to invalid instruction. If the speech data corresponds to invalid instruction, i.e., the corresponding operating instruction is not recognized, the cloud server sends the smart device a preset guidance speech with the highest use frequency, for example, "if you'd like to listen to music, you may speak 'I'd like to listen to music' to me". The guidance speech here is used to guide the user to send a valid instruction. A specific guidance speech is not limited.

Preferably, the preset guidance speech may be a recorded audio, or a speech signal obtained by converting text data into speech by using a Text to Speech speech synthesis software TTS (Text to Speech).

As can be seen from the above introduction, according to the modes of the above embodiments, it is possible to, through the passive function guidance, satisfy the user's active question-asking, and answer right after the question is asked, without causing information complexity and confusion to the user; it is possible to, through the active function guidance, trigger according to the user's operation, and offer a reminder when the user feels puzzled and needs reminding. It is possible to enable the user to perform function guidance efficiently and concisely through speech interaction.

Those skilled in the art can clearly understand that for purpose of convenience and brevity of depictions, reference may be made to corresponding procedures in the aforesaid method embodiments for specific operation procedures of the terminal and server, apparatus and units described above, which will not be detailed any more.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be integrated or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit or they can be separate physical presences; or two or more units can be integrated in one unit. The integrated unit described above can be implemented in the form of hardware, or they can be implemented with hardware plus software functional units.

Figure 3:
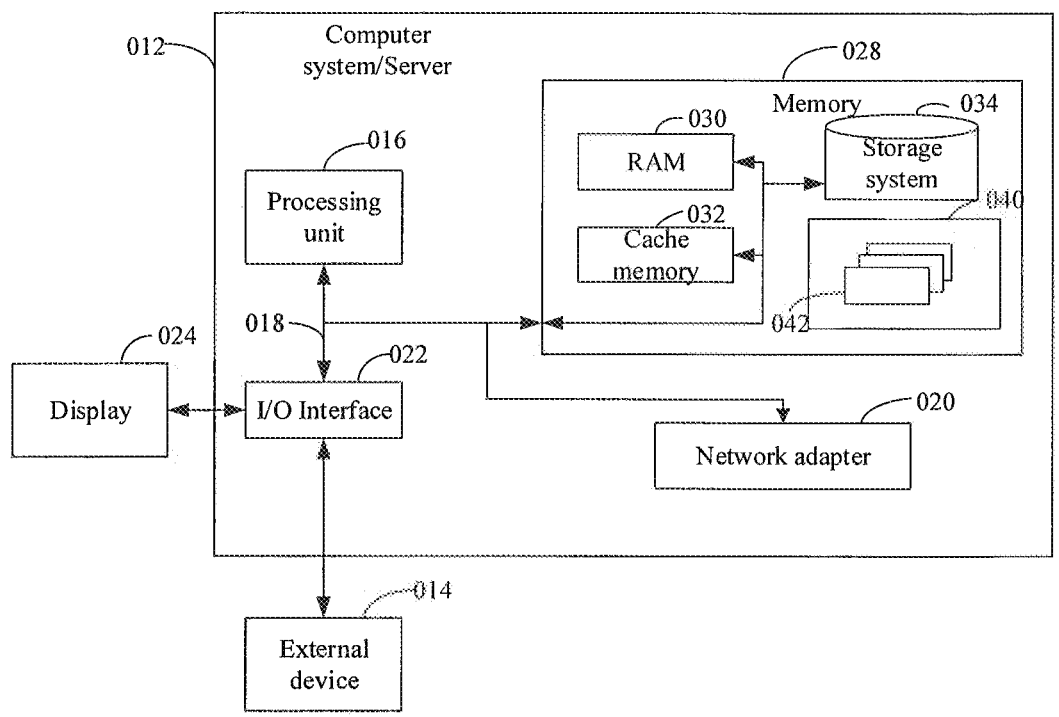
FIG. 3 illustrates a block diagram of an example computer system/server 012 adapted to implement an implementation mode of the present disclosure.

FIG. 3 illustrates a block diagram of an example computer system/server 012 adapted to implement an implementation mode of the present disclosure. The computer system/server 012 shown in FIG. 3 is only an example and should not bring about any limitation to the function and scope of use of the embodiments of the present disclosure.

As shown in FIG. 3, the computer system/server 012 is shown in the form of a general-purpose computing device. The components of computer system/server 012 may include, but are not limited to, one or more processors (processing units) 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes functions and/or methods in embodiments described in the present disclosure by running programs stored in the system memory 028.

The above-mentioned computer program may be set in a computer storage medium, i.e., the computer storage medium is encoded with a computer program. When the program, executed by one or more computers, enables said one or more computers to execute steps of methods and/or operations of apparatuses as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be integrated or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A smart device function guiding method, comprising:
   obtaining a user's speech data and obtaining an operation instruction corresponding to the speech data; and
   sending a guidance speech to the smart device in response to determining that the operation instruction complies with the preset guidance condition, which comprises:
      in response to determining that the operation instruction is of a function operating type and reaches the preset trigger condition of the function operating type instruction, looking up the preset guidance speech corresponding to the operation instruction in a function guidance library, and sending the preset guidance speech to the smart device, and performing active function guidance to the user,
   wherein the preset trigger condition comprises at least one of:
      the operation instruction is received from—the user with respect to a certain function for the first time;
      the operation instruction is a less-efficient operation instruction, and is received from the user within a preset time period for multiple times which reach a preset times threshold;
      the operation instruction is received frequently from the user and there exist other operation instructions for implementing the same function;
      the operation instruction has similar operation instructions or functions which are newly get online; and
   wherein
   in the case that the preset trigger condition is that the operation instruction is received from the user with respect to a certain function for the first time, the corresponding preset guidance speech is an important instruction of the function;
   in the case that the preset trigger condition is that the operation instruction is a less-efficient operation instruction, and is received from the user within a preset time period for multiple times which reach a preset times threshold, the corresponding preset guidance speech is a high-efficiency operation instruction corresponding to the operation instruction;
   in the case that the preset trigger condition is that the operation instruction is received frequently from the user and there exist other operation instructions for implementing the same function, the corresponding preset guidance speech is other operation instructions of the function;
   in the case that the preset trigger condition is that the operation instruction has similar operation instructions or functions which are newly get online, the corresponding preset guidance speech is similar operation instructions or functions which are newly get online.

2. The method according to claim 1, wherein the obtaining a user's speech data and obtaining an operation instruction corresponding to the speech data comprises:
   receiving the user's speech data obtained by monitoring of the smart device;
   performing speech recognition for the speech data to obtain a recognized text corresponding to the speech data;

performing semantic analysis for the recognized text to obtain the operation instruction corresponding to the recognized text.

3. The method according to claim 1, wherein the sending a guidance speech to the smart device in response to determining that the operation instruction complies with the preset guidance condition further comprises:

in response to determining that the operation instruction is of an active question-asking type, looking up the preset guidance speech corresponding to the operation instruction in a function guidance library, sending the preset guidance speech to the smart device, and performing passive function guidance to the user.

4. The method according to claim 3, wherein performing a single round of passive function guidance or multiple rounds of passive function guidance to the user according to a function complexity degree corresponding to the operation instruction.

5. The method according to claim 1, wherein the method further comprises:

executing the operation instruction.

6. A computer device, comprising:

a memory;

a processor; and a computer program which is stored on the memory and runnable on the processor, wherein the processor, upon executing the program, implements a smart device function guiding method, wherein the method comprises:

obtaining a user's speech data and obtaining an operation instruction corresponding to the speech data; and sending a guidance speech to the smart device in response to determining that the operation instruction complies with the preset guidance condition, which comprises:

in response to determining that the operation instruction is of a function operating type and reaches the preset trigger condition of the function operating type instruction, looking up the preset guidance speech corresponding to the operation instruction in a function guidance library, and sending the preset guidance speech to the smart device, and performing active function guidance to the user, wherein the preset trigger condition comprises at least one of:

the operation instruction is received from the user with respect to a certain function for the first time;

the operation instruction is a less-efficient operation instruction, and is received from the user within a preset time period for multiple times which reach a preset times threshold;

the operation instruction is received frequently from the user and there exist other operation instructions for implementing the same function;

the operation instruction has similar operation instructions or functions which are newly get online; and wherein in the case that the preset trigger condition is that the operation instruction is received from the user with respect to a certain function for the first time, the corresponding preset guidance speech is an important instruction of the function;

in the case that the preset trigger condition is that the operation instruction is a less-efficient operation instruction, and is received from the user within a preset time period for multiple times which reach a preset times threshold, the corresponding preset guidance speech is a high-efficient operation instruction corresponding to the operation instruction;

in the case that the preset trigger condition is that the operation instruction is received frequently from the user and there exist other operation instructions for implementing the same function, the corresponding preset guidance speech is other operation instructions of the function;

in the case that the preset trigger condition is that the operation instruction has similar operation instructions or functions which are newly get online, the corresponding preset guidance speech is similar operation instructions or functions which are newly get online.

7. The computer device according to claim 6, wherein the obtaining a user's speech data and obtaining an operation instruction corresponding to the speech data comprises:

receiving the user's speech data obtained by monitoring of the smart device;

performing speech recognition for the speech data to obtain a recognized text corresponding to the speech data;

performing semantic analysis for the recognized text to obtain the operation instruction corresponding to the recognized text.

8. The computer device according to claim 6, wherein the sending a guidance speech to the smart device response to determining that the operation instruction complies with the preset guidance condition further comprises:

in response to determining that the operation instruction is of an active question-asking type, looking up the preset guidance speech corresponding to the operation instruction in a function guidance library, sending the preset guidance speech to the smart device, and performing passive function guidance to the user.

9. The computer device according to claim 8, wherein performing a single round of passive function guidance or multiple rounds of passive function guidance to the user according to a function complexity degree corresponding to the operation instruction.

10. The computer device according to claim 6, wherein the method further comprises:

executing the operation instruction.

11. A non-transitory computer-readable storage medium on which a computer program is stored, wherein the program, when executed by a processor, implements a smart device function guiding method, wherein the method comprises:

obtaining a user's speech data and obtaining an operation instruction corresponding to the speech data; and sending a guidance speech to the smart device in response to determining that the operation instruction complies with the preset guidance condition, which comprises:

in response to determining that the operation instruction is of a function operating type and reaches the preset trigger condition of the function operating type instruction, looking up the preset guidance speech corresponding to the operation instruction in a function guidance library, and sending the preset guidance speech to the smart device, and performing active function guidance to the user, wherein the preset trigger condition comprises at least one of:

the operation instruction is received from—the user with respect to a certain function for the first time;

the operation instruction is a less-efficient operation instruction, and is received from the user within a preset time period for multiple times which reach a preset times threshold;

the operation instruction is received frequently from the user and there exist other operation instructions for implementing the same function;

the operation instruction has similar operation instructions or functions which are newly get online; and wherein in the case that the preset trigger condition is that the operation instruction is received from the user with respect to a certain function for the first time, the corresponding preset guidance speech is an important instruction of the function;

in the case that the preset trigger condition is that the operation instruction is a less-efficient operation instruction, and is received from the user within a preset time period for multiple times which reach a preset times threshold, the corresponding preset guidance speech is a high-efficient operation instruction corresponding to the operation instruction;

in the case that the preset trigger condition is that the operation instruction is received frequently from the user and there exist other operation instructions for implementing the same function, the corresponding preset guidance speech is other operation instructions of the function;

in the case that the preset trigger condition is that the operation instruction has similar operation instructions or functions which are newly get online, the corresponding preset guidance speech is similar operation instructions or functions which are newly get online.

12. The non-transitory computer-readable storage medium according to claim 11, wherein the obtaining a user's speech data and obtaining an operation instruction corresponding to the speech data comprises:

receiving the user's speech data obtained by monitoring of the smart device;

performing speech recognition for the speech data to obtain a recognized text corresponding to the speech data;

performing semantic analysis for the recognized text to obtain the operation instruction corresponding to the recognized text.

13. The non-transitory computer-readable storage medium according to claim 11, wherein the sending a guidance speech to the smart device in response to determining that the operation instruction complies with the preset guidance condition further comprises:

in response to determining that the operation instruction is of an active question-asking type, looking up the preset guidance speech corresponding to the operation instruction in a function guidance library, sending the preset guidance speech to the smart device, and performing passive function guidance to the user.

14. The non-transitory computer-readable storage medium according to claim 13, wherein performing a single round of passive function guidance or multiple rounds of passive function guidance to the user according to a function complexity degree corresponding to the operation instruction.

* * * * *